UNITED STATES PATENT OFFICE.

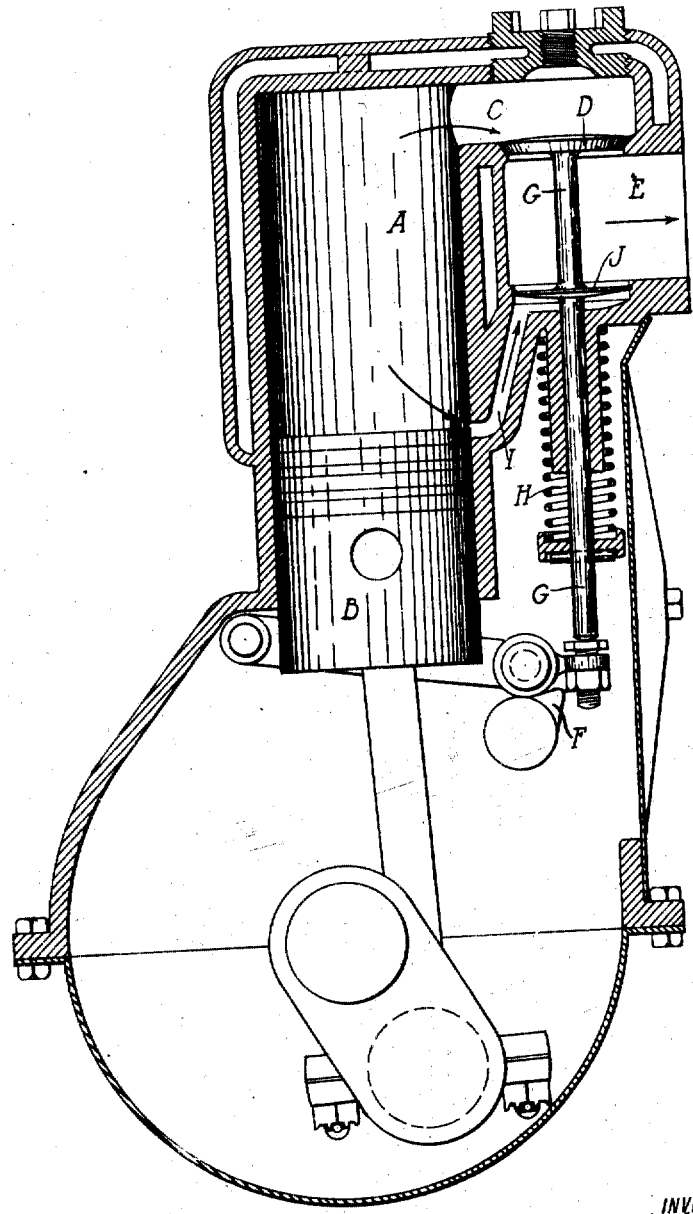

OLE O. STORLE AND GARFIELD STORLE, OF TACOMA, WASHINGTON.

BALANCED EXHAUST-VALVE FOR EXPLOSIVE-ENGINES.

1,218,487.                 Specification of Letters Patent.         Patented Mar. 6, 1917.

Application filed May 21, 1915.  Serial No. 29,553.

*To all whom it may concern:*

Be it known that we, OLE O. STORLE and GARFIELD STORLE, citizens of the United States, residing at the city of Tacoma, in the county of Pierce and State of Washington, have invented certain new and useful Improvements in Balanced Exhaust-Valves for Explosive-Engines, of which the following is a specification.

Our invention pertains to puppet exhaust valves for gasolene and other explosive engines now widely used in all kinds of motor vehicles.

The object of our invention is to so utilize the pressure of the spent explosion within the cylinder in opening the exhaust valve as to reduce to a minimum the required power of the valve operating mechanism of the engine.

We attain this object by means of the mechanism illustrated in the accompanying drawing, which comprises but one figure representing a section lengthwise through the cylinder and exhaust port of a common form of a gasolene or explosive engine.

In the drawing the cylinder interior is represented at A and the piston at B, the latter being near the end of its stroke and at the beginning of the exhaust of the explosive gas. The exhaust port is shown at C, the valve gate at D and the discharge at E. The operating mechanism is the cam F which lifts the stem G and the valve gate D mounted thereon, and allows the spent gas to exhaust from the cylinder A. When the cam F passes beyond the lifting point, the spring H acting on the stem G closes the valve gate D and the cylinder is clear for another action.

It will be observed that the exhaust valve with but the one gate D requires the cam F to not only lift the stem G against the spring H, but also to lift the gate D against the pressure of the spent explosion of the cylinder A which at times is very great and requires much power in the cam F.

The purpose of our invention is to so utilize the pressure of the spent explosion as to balance the pressure on the gate D and require that the cam F only lift the weight of the stem, the valve gate and the pressure of the spring H.

We accomplish this purpose by making an auxiliary exhaust port I and gate J opposite the gate D as shown in the drawing. The port I is opened only as the piston B nears the end of its stroke when the gas escaping from the cylinder A strikes the gate J with a pressure equal to and opposite to the pressure on the gate D. The valve pressure is thus balanced and the power required to operate the cam F is reduced to a minimum. This enables the exhaust valve to be easily operated.

It will be observed that the auxiliary port I is open only during the exact time necessary to balance the gate D and relieve the cam F of the usual excessive strain heretofore required.

It will be observed that the peripheral edge of the gate J is relatively thin and that it plays loosely within the opening in which it fits, in close proximity to the walls of the opening. This is for the purpose of preventing scale adhering to the gate and to cause the edge of the gate to act as a cleaner for the opening in which it works, so that scales that may be formed will when loosened be carried off by the exhaust passing through the port I.

Our invention as herein shown and described will not only secure a saving of power in the cam F but will relieve the operating mechanism of much strain that will make a saving in gas, depreciation and upkeep. The improvement is so simple that it is applicable to any form and size of a gas or explosive engine without additional mechanism thereto. The exhaust valve being thus balanced, it will be practicable to enlarge the same without any loss of power in its operation which cannot now be done with the ordinary puppet valves in use.

Having thus described our invention, what we claim as new and desire to secure by Letters Patent is:—

1. In an explosive engine, the combination with a piston cylinder having a main exhaust port and an auxiliary exhaust port leading from different points in the cylinder and communicating with an exhaust discharge, of a balanced controlling exhaust valve comprising a stem provided with spaced apart valves disposed to control communication between both exhaust ports and the exhaust discharge, substantially as described.

2. In an explosive engine, the combination with a piston cylinder having a main exhaust port and an auxiliary exhaust port leading from different points in the cylinder and communicating through separate valve openings into an exhaust discharge, of a balanced controlling exhaust valve comprising a stem provided with a valve for each opening into the exhaust discharge, the valve for the opening of the auxiliary port having a relatively thin peripheral edge and operating within said opening with its edge in proximity to the wall of the opening, substantially as described.

3. In an explosive engine, the combination with a piston cylinder having a main exhaust port at one end of the cylinder and an auxiliary exhaust port at a point toward the other end and both communicating through separate valve openings into an exhaust discharge, of a balanced controlling exhaust valve comprising a cam operated spring influenced stem provided with a valve for each opening into the exhaust discharge, the exhaust pressure on the main exhaust port valve being counterbalanced by the exhaust pressure through the auxiliary port on the valve provided for that port, substantially as described.

In testimony whereof we affix our signatures in presence of two witnesses.

OLE O. STORLE.
GARFIELD STORLE.

Witnesses:
NORMAN STORLE,
GEO. H. DRISKELL.